United States Patent [19]

Gober

[11] Patent Number: 4,819,474

[45] Date of Patent: Apr. 11, 1989

[54] METAL FORMING MACHINE HAVING A STROKE POSITION ADJUSTING ASSEMBLY

[75] Inventor: Norbert Gober, Leverkusen, Fed. Rep. of Germany

[73] Assignee: Eumuco Aktiengesellschaft für Maschinenbau, Leverkusen, Fed. Rep. of Germany

[21] Appl. No.: 148,645

[22] Filed: Jan. 26, 1988

[30] Foreign Application Priority Data

Feb. 19, 1987 [DE] Fed. Rep. of Germany ....... 3705235

[51] Int. Cl.4 .............................................. B21J 9/20
[52] U.S. Cl. ........................................ 72/441; 72/446; 72/450; 100/257
[58] Field of Search ................. 72/441, 444, 446, 450; 74/600, 571 R, 571 M, 571 L; 100/257, 282

[56] References Cited

U.S. PATENT DOCUMENTS

| 2,790,331 | 4/1957 | Pinkvoss | 74/571 |
| 3,122,033 | 2/1964 | Riemenschneider | 100/257 |
| 3,726,123 | 4/1973 | Bothe | 72/446 |
| 3,834,216 | 9/1974 | Schiller et al. | 72/446 |

FOREIGN PATENT DOCUMENTS

| 922927 | 3/1973 | Canada | 74/571 |
| 2258113 | 10/1973 | Fed. Rep. of Germany | 72/446 |

*Primary Examiner*—David Jones
*Attorney, Agent, or Firm*—Neil F. Markva

[57] ABSTRACT

The stroke position adjusting assembly adjusts the stroke position of a pressing rod for a ram of a forging press. The pressing rod is arranged between the crank drive and the ram and includes an eccentric bushing. Adapting pieces rest against the perimeter of the bushing and are connected to tie-rods operable by a piston cylinder unit.

18 Claims, 2 Drawing Sheets

METAL FORMING MACHINE HAVING A STROKE POSITION ADJUSTING ASSEMBLY

FIELD OF THE INVENTION

The invention relates to a forging press, in particular to a die forging press comprising an assembly for adjusting by means of an eccentric bushing the stroke position of the pitman or the connecting rod arranged between the crank drive or the like and the ram or wedge or the like.

BACKGROUND OF THE INVENTION

A stroke position adjusting assembly is required in case of eccentric, crank or wedge presses or the like in order to allow to adjust the thickness of the workpieces as well as their exact dimensional accuracy, it being necessary to consider that differences in thickness may be due to frame elongation, variations in temperature of the machine and tool and tool wear. An adjusting assembly is required to adapt the stroke position to said changing marginal conditions.

For changing the stroke position of a ram with respect to the press bed, it has been known to use an eccentric bushing for a pressure transmission bolt provided at its circumference with a worm toothing engaged by a worm of the adjusting means, it being possible to fix the eccentric bushing by a clamping device. In case of the known stroke position devices, the adjusting operation, i.e. releasing the bracing of the eccentric bushing and setting it, takes a relatively large amount of time. In other words, it is necessary to interrupt for a longer or less long time the operation of the metal forming machine in view of the setting of the stroke position, whereby the machine output is reduced.

SUMMARY OF THE INVENTION

It is the object of the invention to design, in case of a metal forming machine, the stroke position adjusting assembly in such a way that the setting of the stroke position of the pitman or the like may be performed quickly, in particular without an interruption of the machine working cycle. The invention is characterized, in connection with a metal forming machine of the above mentioned type comprising an adjustable eccentric bushing, in that the pitman or the like has flexible legs having fixed thereto adapting pieces adjacent to the eccentric bushing, and that the pitman legs are connected by tie rods operable by a piston-cylinder unit.

Due to such a design of the adjusting assembly, the braced condition of the eccentric bushing may be released in a very short time, thus allowing to practically perform the release of such bracing simultaneously with the adjustment e.g. rotation of the eccentric bushing. The pitman legs are held spread apart by the tie rods. Further, the bracing of the eccentric bushing may be carried out just as quickly in that the spread position of the pitman legs is cancelled. By this means, time is saved. Further, the construction of the adjusting assembly is simple, and its operation is mechanically reliable.

According to another feature of the invention, linkage arrangement means include tie rods in knuckle joint arrangement and flexibly engage the piston of the cylinder unit. It is suitable for the piston to be under the action of a biassed spring system. The knuckle joint arrangement for adjusting the tie rods substantially contributes to the short setting times for releasing and effecting bracing. In fact, by the flexible tie rod legs, the piston spring force intensified by the knuckle joint arrangement of the tie rods is transferred as a clamping force to the eccentric bushing.

Suitably, the pitman legs are of a materially-elastic, flexible design.

The stated spring mounting ensured by a pressure spring may be supported by the cylinder bottom of the piston-cylinder unit, said cylinder bottom being adequately provided in the form of a jaw adjoined to the eccentric bushing.

The adapting pieces advantageously become engaged via projections of the cylinder housing or of the jaw of the cylinder. Preferable, the shoulder surfaces of the projections are inclined thus allowing to compensate the friction component of the reaction force counteracting the opening of the pitman legs.

BRIEF DESCRIPTION OF DRAWINGS

One embodiment of the invention will be now explained hereunder with reference to the drawings in which.

DETAILED DESCRIPTION OF DRAWINGS

Figure 1:
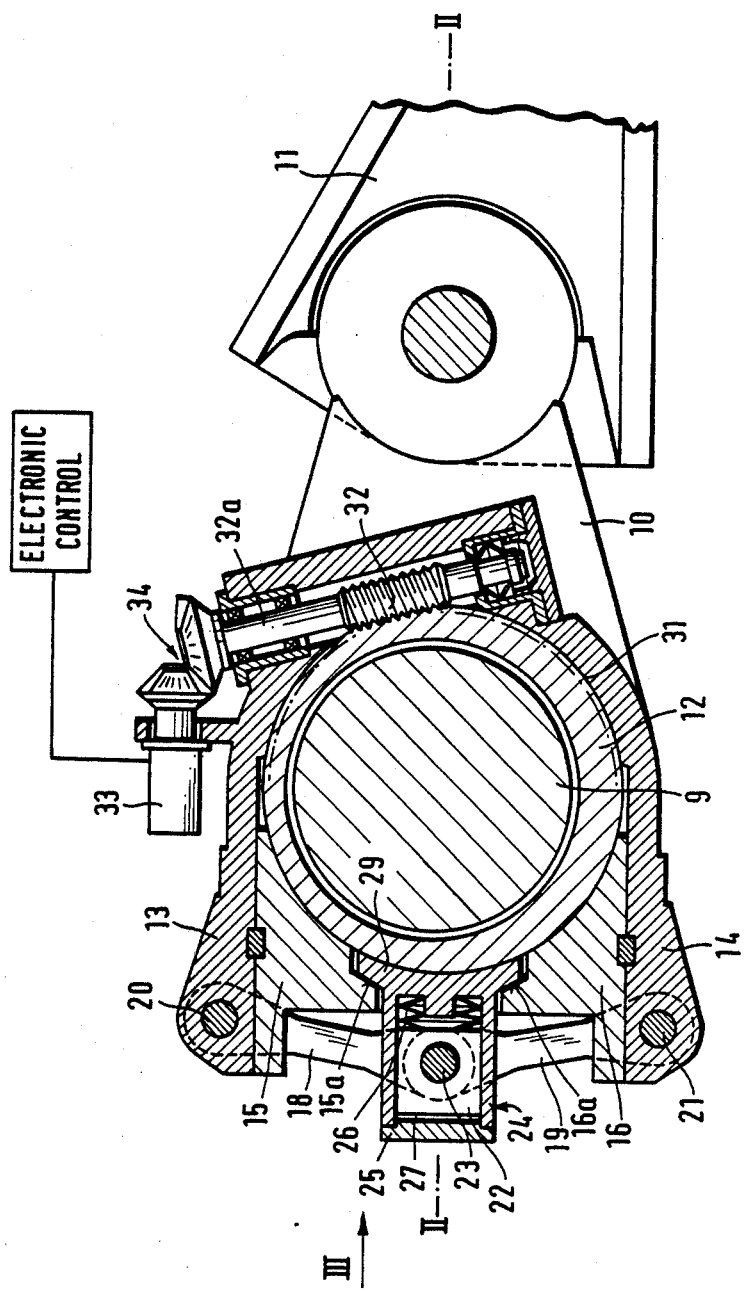
FIG. 1 shows a schematic longitudinal section of the clamping and adjusting assembly for the stroke position adjustment of the pitman or the like, FIG. 2 is a horizontal section of the adjusting assembly of FIG. 1 along line II—II.
Figure 2:
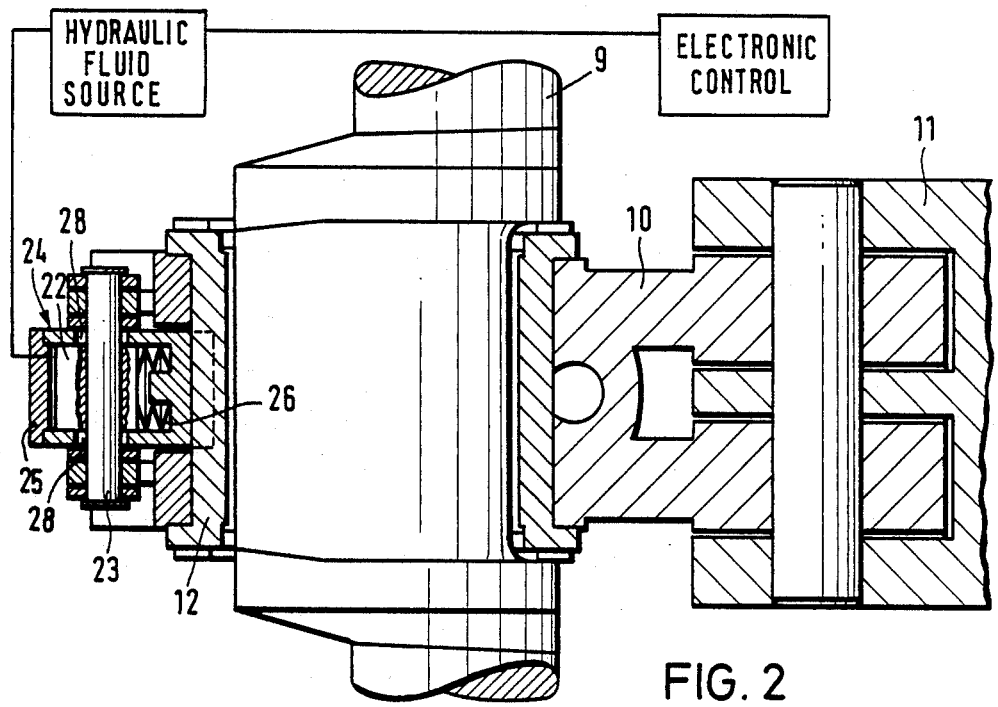
Figure 3:
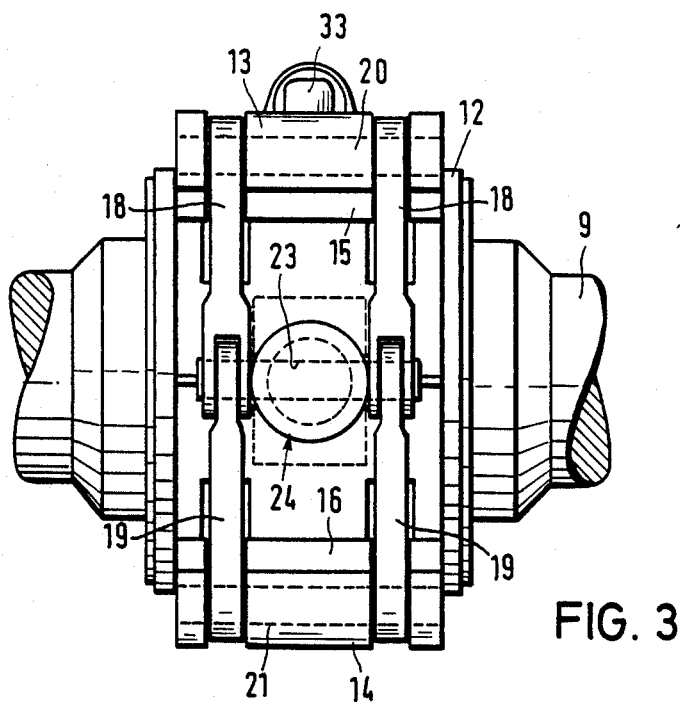
FIG. 3 shows an end view of the adjusting assembly of FIG. 1 in direction of arrow III.

The metal forming machine, e.g. a forging press, usually comprises a crank- or eccentric shaft 9 which is mounted in the machine frame and driven by a motor. In the illustrated example concerning a wedge press, the eccentric shaft or the like which is embraced by a pitman 10 acts on a wedge 11 inducing the stroke movement of a (non-illustrated) ram adapted to carry the upper tool, the lower tool being fastened on a press bed.

An eccentric bushing 12 is mounted in pitman 10 comprising freely ending legs 13 and 14 to which the adapting pieces 15 and 16 are secured which rest against the eccentric bushing 12. Via hinge pins 20 and 21, tie rods 18 and 19 are pivotally connected to the pitman legs 13 and 14, on the one hand, while on the other hand, said tie rods 18 and 19 engage via the common bolt 23 a piston 22 which is slidingly supported in a cylinder 24 being closed by a cover 25. Piston 22 is under the action of a spring 26, e.g. of the plate type, as a pressure spring. Reference numeral 27 designates the cylinder chamber 27 which may be attacked hydraulically. The bottom of cylinder 24 is shaped as a jaw 29 resting against the eccentric bushing 12. In the cylinder 24, elongated holes 28 are provided for the bolts 23.

The eccentric bushing 12 is provided with an external toothing 31 engaging a worm shaft 32. By a motor 33, the worm shaft 32 may be driven via a beveled wheel gear 34 fixed to the shaft shank 32a of worm 32.

Both pitman legs 13 and 14 are made of elastically flexible material, i.e. they are springingly flexible so as to transfer with the adapting pieces 15 and 16 fixed thereto a clamping force to the eccentric bushing 12 when in a tightening or clamping position. The bracing effect of the eccentric bushing 12 is supported by tie rods 18, 19 and by piston 22 which, under the action of spring 25, is held displaced towards the cylinder cover 25. The pressure spring 25 finding its support at the cylinder bottom formed as a jaw 29, a clamping effect is exerted via jaw 29 on the eccentric bushing 12.

To release the clamping force, a hydraulic pressure medium is introduced into the cylinder chamber 27. Due to the forces at piston 22, the tie rods 18, 19 in knuckle joint arrangement are moved to take a stretched position with a resultant spreading of both pitman legs 13 and 14, while the clamping condition is released. Further, jaw 29 is released as well.

The pressure force on cover 25 of cylinder 24 supports itself against the projections 14a and 15a of the adapting pieces 14, 15 with the aid of jaw 29. The shoulder surfaces of the projections 14a, 15a, are inclined in order to eliminate the friction component of the reaction force counteracting the opening movement of the pitman legs.

By means of the flexible pitman legs 13, 14 and the tie rod arrangement, the clamping of the eccentric bushing 12 is immediately released. Practically at the same time, the adjustment, i.e. the rotation of the eccentric bushing 12, may be effected by the adjusting assembly 32-34. Upon adjustment of the eccentric bushing, the spread position of the two pitman legs 13, 14 may be released by cease of the hydraulic attack on piston 22 under the action of spring 26, thus causing an immediate clamping effect. As a result of such a quick clamping and unclamping of the eccentric bushing, it is possible to adjust the latter between two strokes of the press without the need of stopping it to effect such adjustment.

Having thus set forth and disclosed the nature of this invention, what is claimed is:

1. A metal forming machine comprising:
    (a) an adjusting assembly for the stroke position of a pitman arranged between a crank drive and ram means,
    (b) said adjusting assembly having an eccentric bushing adapted to be related at its periphery by worm shaft means and to be fixed by clamping means,
    (c) said pitman including flexible pitman legs having fixed thereto adapting pieces resting against the eccentric bushing, and that the pitman legs are connected to tie-rods operable by a piston cylinder unit,
    (d) the pitman legs are connected to tie-rods in a knuckle joint arrangement,
    (e) said tie-rods pivotally engage a piston of a cylinder unit, and
    (f) the piston is biased under the action of a spring system.

2. A metal forming machine as set forth in claim 1, wherein
    the spring system includes a pressure spring supported on a bottom end of a cylinder, and
    the cylinder bottom end includes a jaw which rests against the eccentric bushing.

3. A metal forming machine as set forth in claim 2, wherein
    the adapting pieces are effective to engage projections over the jaws of the cylinder.

4. A metal forming machine as set forth in claim 3, wherein
    the projections include an inclined shoulder surface.

5. A metal forming machine as set forth in claim 4, wherein
    the pitman legs are made of elastically flexible material.

6. A metal forming machine as set forth in claim 5, wherein
    the piston carries a bolt pivotally coupling the tie-rods which extend through elongated holes of the cylinder.

7. In a metal forming machine, a stroke position adjusting assembly comprising:
    (a) pitman means arranged between a crank drive and ram means with an eccentric bushing adapted to be rotated at its periphery by drive means and to be fixed by clamping means,
    (b) the pitman means having an adjustable stroke position and including flexible pitman leg means having free ends which flexibly bend between a stroke setting position and a spread position,
    (c) said free ends being disposed at opposing sides of the eccentric bushing and including means engaging the opposing sides of the eccentric bushing,
    (d) a knuckle joint arrangement including tie-rods connected at an outer end thereof to a respective free end of the pitman leg means and at an inner end thereof connected to move with piston means in a piston cylinder unit, and
    (e) said knuckle joint arrangement being effective to flexibly move said free ends between the stroke setting and spread positions.

8. A stroke position adjusting assembly for adjusting the stroke position of a ram for a forging press having a working cycle, said assembly comprising:
    (a) flexible pitman leg means for clamping in place an eccentric bushing having an outer surface and disposed on a rotatably mounted control rod of the forging press,
    (b) the flexible pitman leg means engage opposing sides of the outer surface of the eccentric bushing to secure the rotational position of the eccentric bushing while the ram is effecting a working stroke,
    (c) linkage arrangement means for tightening and spreading the flexible leg means with respect to the outer surface of the eccentric bushing,
    (d) the linkage means include tie-bar means having outer ends coupled to each of the opposed flexible leg means and inner ends coupled to cylinder unit means for tightening and spreading the flexible leg means.

9. An assembly as defined in claim 8 wherein
    the cylinder unit means includes a piston movably disposed within a cylinder chamber and biasing means to move the piston back and forth within the cylinder chamber,
    said inner ends of the tie-bar means being pivotally connected to the piston.

10. An assembly as defined in claim 9 wherein
    the biasing means includes mechanical spring means for urging the piston in one direction and hydraulic means for urging the piston opposite to said one direction.

11. An assembly as defined in claim 10 wherein
    said mechanical spring means is effective to move the piston away from the eccentric bushing for tightening the flexible leg means and said hydraulic means is effective to move the piston toward the eccentric bushing for spreading the flexible leg means.

12. An assembly as defined in claim 8 wherein
    the flexible leg means includes adapting pieces fixed to flexible freely ending leg members,
    said adapting pieces contacting the outer surface of the eccentric bushing for transmitting a clamping force to clamp the eccentric bushing in place.

13. An assembly as defined in claim 8 wherein
the flexible pitman leg means includes flexible freely ending leg members having shaped adapting pieces fixed thereto for transmitting a clamping force to the eccentric bushing.

14. An assembly as defined in claim 13 wherein
the freely ending leg members are composed of springingly flexible material.

15. An assembly as defined in claim 8 wherein
the tie-bar means include tie-bar members each connected at one end thereof to a flexible leg member and at the other end thereof to the cylinder unit means.

16. An assembly as defined in claim 15 wherein
the cylinder unit means includes a piston movably disposed within a cylinder chamber and biasing means to move the piston back and forth within the cylinder chamber,
said inner ends of the tie-bar members being pivotally connected to the piston.

17. An assembly as defined in claim 16 wherein
the cylinder unit means includes a base portion, and
the biasing means includes a mechanical spring means abutting one side of the base portion and prestressing the piston to produce the clamping of the eccentric bushing in place.

18. An assembly as defined in claim 16 wherein
the tie-bar members are pivotally connected to the piston with a pivot pin member extending through elongated openings in the cylinder unit means.

* * * * *